United States Patent
Newton

[11] Patent Number: 5,843,491
[45] Date of Patent: Dec. 1, 1998

[54] ROTI CLAPPER

[76] Inventor: John E. Newton, 2115 Leighton Rd., Elmont, N.Y. 11003

[21] Appl. No.: 941,610

[22] Filed: Sep. 30, 1997

[51] Int. Cl.$^6$ ............................ A21C 11/00; A21C 11/02
[52] U.S. Cl. ........................ 425/389; 99/450.2; 425/394; 425/406; 426/496; 426/497; 426/502; 426/512
[58] Field of Search ..................... 425/389, 394, 425/406; 426/502, 496, 512, 503, 497; 99/450.2

[56] References Cited

U.S. PATENT DOCUMENTS

| | | | |
|---|---|---|---|
| D. 267,771 | 2/1983 | Cavalli | D7/157 |
| 4,281,025 | 7/1981 | Longenecker | 426/496 |
| 4,372,737 | 2/1983 | Thompson | 425/394 |
| 4,436,432 | 3/1984 | Droco | 360/95 |
| 4,465,453 | 8/1984 | Turner et al. | 425/394 |
| 4,580,903 | 4/1986 | Ihler et al. | 366/76 |
| 4,610,837 | 9/1986 | Frey | 425/394 |
| 4,766,766 | 8/1988 | Ahler et al. | 73/169 |
| 4,806,090 | 2/1989 | Finlay | 425/394 |
| 4,857,349 | 8/1989 | Finlay | 425/394 |
| 5,007,820 | 4/1991 | Schwab et al. | 425/333 |
| 5,204,125 | 4/1993 | Larsen | 425/289 |
| 5,281,427 | 1/1994 | Rahim | 425/406 |
| 5,445,840 | 8/1995 | Wadell | 426/496 |
| 5,558,894 | 9/1996 | Henson et al. | 426/496 |

*Primary Examiner*—Khanh P. Nguyen

[57] ABSTRACT

A roti clapper is provided including a pair of clamping members pivotally coupled at the bottom ends thereof. Next provided is a solenoid connected to the clamping members for closing the same upon the actuation thereof. Control circuitry is provided for actuating the solenoid a predetermined amount of times upon the closing of an associated switch.

9 Claims, 2 Drawing Sheets

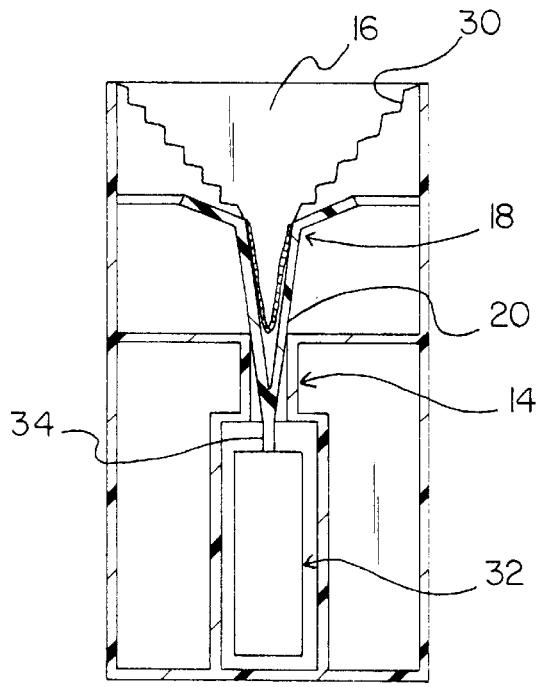
FIG. 3
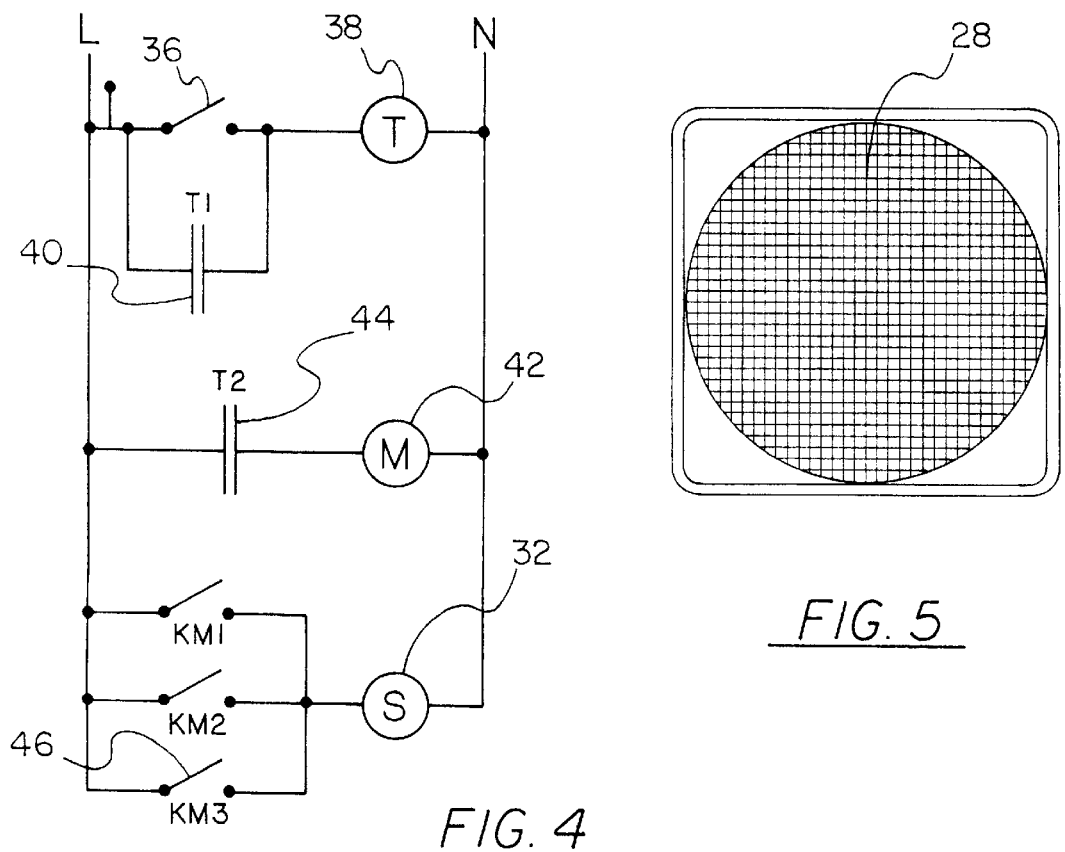
FIG. 4
FIG. 5

ROTI CLAPPER

BACKGROUND OF THE INVENTION

1. Field of the Invention

The present invention relates to kneading machines and more particularly pertains to a new roti clapper for clapping roti bread when removed from an oven.

2. Description of the Prior Art

The use of kneading machines is known in the prior art. More specifically, kneading machines heretofore devised and utilized are known to consist basically of familiar, expected and obvious structural configurations, notwithstanding the myriad of designs encompassed by the crowded prior art which have been developed for the fulfillment of countless objectives and requirements.

Known prior art kneading machines include U.S. Pat. No. 5,204,125; U.S. Pat. No. 4,580,903; U.S. Pat. No. 4,436,432; U.S. Pat. No. 4,766,766; U.S. Pat. No. 5,007,820; and U.S. Pat. No. Des. 267,771.

In these respects, the roti clapper according to the present invention substantially departs from the conventional concepts and designs of the prior art, and in so doing provides an apparatus primarily developed for the purpose of clapping roti bread when removed from an oven.

SUMMARY OF THE INVENTION

In view of the foregoing disadvantages inherent in the known types of kneading machines now present in the prior art, the present invention provides a new roti clapper construction wherein the same can be utilized for forming roti bread when removed from an oven.

The general purpose of the present invention, which will be described subsequently in greater detail, is to provide a new roti clapper apparatus and method which has many of the advantages of the kneading machines mentioned heretofore and many novel features that result in a new roti clapper which is not anticipated, rendered obvious, suggested, or even implied by any of the prior art kneading machines, either alone or in any combination thereof.

To attain this, the present invention generally comprises includes a housing having a rectangular configuration with an open top and a closed bottom defining an interior space. The interior space defines a lower thin channel, an upper open top, and an intermediate beveled portion having a V-shaped vertical cross-section. Note FIG. 3. FIGS. 2 & 3 show a pair of clamping members each defined by a portion of an inverted cone. The pair of clamping members each have an arcuate interior surface with a rubber pad coupled thereto. Each rubber pad has a plurality of undulations formed thereon between a top end and a bottom end of each clamping member. The clamping members are pivotally coupled at the bottom ends thereof. FIG. 1 shows a flexible net having a circular configuration. At least a portion of the net is connected between the top ends of the pair of clamp members. A pair of flexible springs are included each having a first end connected to the top end of an associated one of the clamping members and a second end connected to the housing. The springs thus function for maintaining the top ends of the pair of clamping members in a raised separated orientation with the net taut for bread to be rested thereon. Next provided is a solenoid situated within the lower thin channel adjacent a bottom end thereof. The solenoid has a transducer connected to the bottom ends of the clamping members for pulling each clamping member downwardly. When being pulled down, an outer surface of the clamping member abuts the intermediate beveled portion of the housing for bringing the top ends of the pair of clamping members in a lowered closed orientation. The net then depends between the clamping members such that the bread may be clapped upon the actuation thereof. Finally, control means is provided for actuating the solenoid a predetermined amount of times upon the closing of an associated switch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new roti clapper apparatus and method which has many of the advantages of the kneading machines mentioned heretofore and many novel features that result in a new roti clapper which is not anticipated, rendered obvious, suggested, or even implied by any of the prior art kneading machines, either alone or in any combination thereof.

It is another object of the present invention to provide a new roti clapper which may be easily and efficiently manufactured and marketed.

It is a further object of the present invention to provide a new roti clapper which is of a durable and reliable construction.

An even further object of the present invention is to provide a new roti clapper which is susceptible of a low cost of manufacture with regard to both materials and labor, and which accordingly is then susceptible of low prices of sale to the consuming public, thereby making such roti clapper economically available to the buying public.

Still yet another object of the present invention is to provide a new roti clapper which provides in the apparatuses and methods of the prior art some of the advantages thereof, while simultaneously overcoming some of the disadvantages normally associated therewith.

Still another object of the present invention is to provide a new roti clapper for forming roti bread when removed from an oven.

Even still another object of the present invention is to provide a new roti clapper that includes a pair of clamping members pivotally coupled at the bottom ends thereof. Next provided is a solenoid connected to the clamping members for closing the same upon the actuation thereof. Control circuitry is provided for actuating the solenoid a predetermined amount of times upon the closing of an associated switch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the clamping members of the present invention in a lowered closed orientation.

FIG. 4 is a schematic diagram of the present invention.

FIG. 5 is a top view of the present invention.

DESCRIPTION OF THE PREFERRED EMBODIMENT

Figure 1:
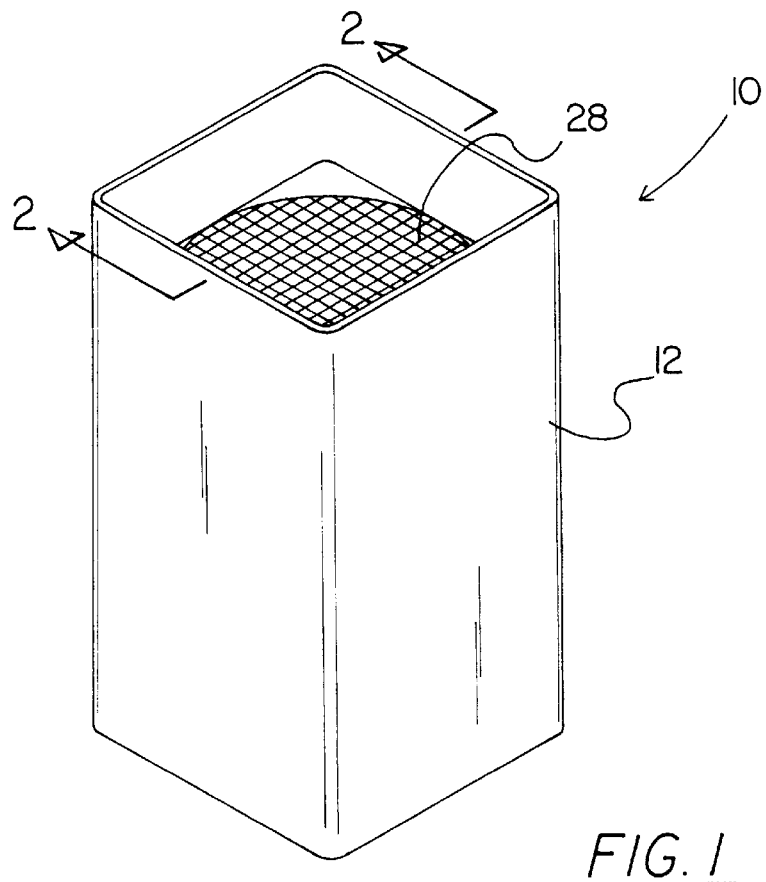
FIG. 1 is a perspective view of a new roti clapper according to the present invention.

With reference now to the drawings, and in particular to FIGS. 1 through 5 thereof, a new roti clapper embodying the principles and concepts of the present invention and generally designated by the reference numeral 10 will be described.

The present invention, as designated as numeral 10, includes a housing 12 having a rectangular configuration with an open top and a closed bottom defining an interior space. The interior space defines a lower thin channel 14, an upper open top 16, and an intermediate beveled portion 18 having a V-shaped vertical cross-section extending between opposite side walls of the housing. Note FIG. 3.

Figure 2:
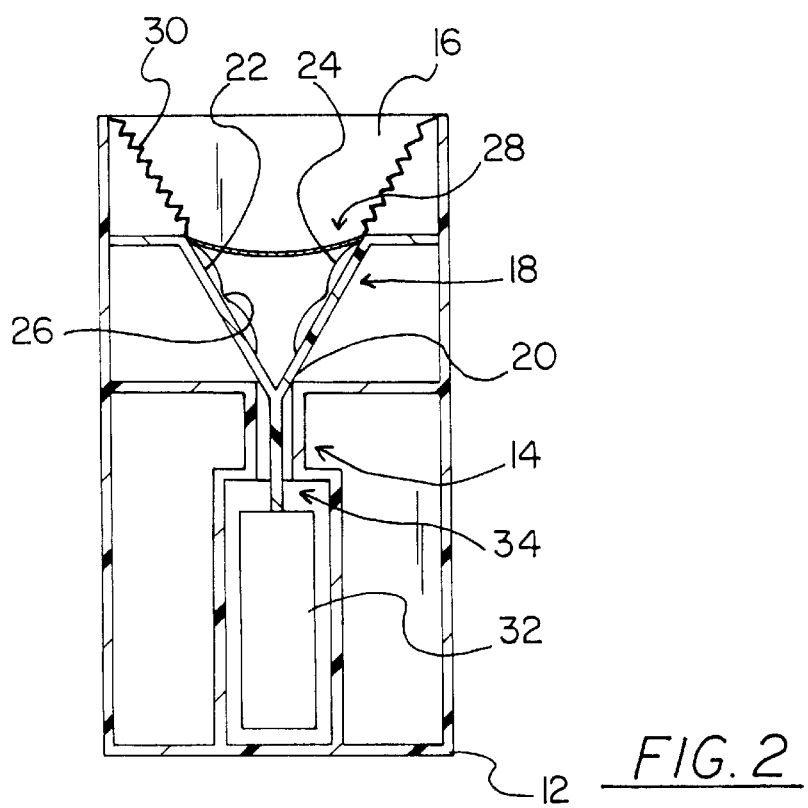
FIG. 2 is a side view of the clamping members of the present invention in a raised open orientation.

FIGS. 2 & 3 show a pair of clamping members 20 each defined by a portion of an inverted cone. The clamping members each has an arcuate interior surface 22 with a rubber pad 24 coupled thereto. Each rubber pad has a plurality of undulations 26 formed thereon between a top end and a bottom end of each clamping member. The clamping members are pivotally coupled at the bottom ends thereof.

FIG. 1 shows a flexible meshed net 28 having a circular configuration. At least a portion of the net is connected between the top ends of the pair of clamp members. As an option, the net may be removable for cleaning purpose.

A pair of flexible springs 30 are included each having a first end connected to the top end of an associated one of the clamping members and a second end connected to the housing. The springs thus function for maintaining the top ends of the pair of clamping members in a raised separated orientation with the net taut for roti bread to be rested thereon. As shown in FIG. 2, the clamping members rest on the intermediate beveled portion when in the raised orientation.

Next provided is a solenoid 32 situated within the lower thin channel adjacent a bottom end thereof. The solenoid has a transducer 34 connected to the bottom ends of the clamping members for pulling each clamping member downwardly. When being pulled down, an outer surface of the clamping member abuts the intermediate beveled portion and the lower channel portion of the housing for bringing the top ends of the pair of clamping members into a lowered closed orientation. While the clamping members close, the net depends between the clamping members such that the bread may be clapped upon the actuation of the solenoid.

Finally, a control means 34 is provided for actuating the solenoid a predetermined amount of times upon the closing of an associated switch. It should be noted that the switch may take the form of either a foot pedal or a simple push button switch 36. To accomplish its intended function, the control means preferably comprises a timer relay coil 38 connected in series with the switch. Note FIG. 4. Associated with the timer relay coil is a first normally open contact 40 connected in parallel with the switch. A servo motor 42 is connect in series with a second normally open contact 44 associated with the timer relay coil and is adapted to rotated upon the receipt of power. The aforementioned solenoid is connected in series with three switches 46 connected in parallel. The three switches are each adapted to close only during a predetermined range of rotation of the servo motor. As such, when the servo motor is provided power by way of the second normally open contact, each the switches take turns actuating the solenoid. It should be noted that the timer relay coil remains closed for an amount of time sufficient to allow the closing of each of the three switches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A roti clapper comprising, in combination:
  a housing having a rectangular configuration with an open top and a closed bottom defining an interior space, the interior space defining a lower thin channel, an upper open top, and an intermediate beveled portion having a V-shaped vertical cross-section;
  a pair of clamping members each defined by a portion of an inverted cone, the pair of clamping members each having an arcuate interior surface with a rubber pad coupled thereto, each rubber pad having a plurality of undulations formed thereon between a top end and a bottom end of each clap, the clamping members being pivotally coupled at the bottom ends thereof;

a flexible net having a circular configuration with at least a portion thereof connected between the top ends of the pair of clamp members;

a pair of flexible springs each having a first end connected to the top end of an associated one of the clamping members and a second end connected to the housing for maintaining the top ends of the pair of clamping members in a raised separated orientation with the net taut for bread to be rested thereon;

a solenoid situated within the lower thin channel adjacent a bottom end thereof, the solenoid having a transducer connected to the bottom ends of the clamping members for pulling each clamping member downwardly such that an outer surface thereof abuts the intermediate beveled portion of the housing for bringing the top ends of the pair of clamping members in a lowered closed orientation with the net depending between the clamping members such that the bread may be clapped upon the actuation thereof;

control means for actuating the solenoid a predetermined amount of times upon the closing of an associated switch.

2. A roti clapper comprising:

a pair of clamping members being pivotally coupled at the bottom ends thereof;

means connected to the clamping members for closing the same upon the actuation thereof; and control circuitry for actuating the means upon the closing of an associated switch.

3. A roti clapper as set forth in claim 2 wherein a housing is provided with a channel into which the clamping members are pulled within upon the actuation of the means for closing the same.

4. A roti clapper as set forth in claim 2 wherein each clamping member is defined by a portion of an inverted cone.

5. A roti clapper as set forth in claim 2 wherein each clamping member each has an arcuate interior surface.

6. A roti clapper as set forth in claim 2 wherein each clamping member is equipped with a rubber pad coupled thereto.

7. A roti clapper as set forth in claim 6 wherein each rubber pad has at least one undulation formed thereon between a top end and a bottom end of each claming member.

8. A roti clapper as set forth in claim 2 wherein the clamping members have a flexible net with at least a portion thereof connected between top ends of the pair of clamp members.

9. A roti clapper as set forth in claim 2 and further including at least one spring for maintaining top ends of the pair of clamping members in a raised separated orientation.

* * * * *